United States Patent
Goy et al.

(10) Patent No.: US 10,584,747 B1
(45) Date of Patent: Mar. 10, 2020

(54) FUEL PUMP BEARING WITH NON-CONCENTRIC INNER DIAMETERS

(71) Applicant: Hamilton Sundstrand Corporation, Charlotte, NC (US)

(72) Inventors: Edward W. Goy, Crystal Lake, IL (US); Ryszard Czeslaw Wlaznik, Rockford, IL (US); Joseph Wetch, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/208,189

(22) Filed: Dec. 3, 2018

(51) Int. Cl.
*F16C 33/10* (2006.01)
*F16C 23/04* (2006.01)

(52) U.S. Cl.
CPC ........ *F16C 33/1065* (2013.01); *F16C 23/041* (2013.01); *F04C 2240/52* (2013.01); *F04C 2240/56* (2013.01)

(58) Field of Classification Search
CPC .............. F04C 2240/50; F04C 2240/52; F04C 2240/56; F16C 17/02; F16C 33/1065; F16C 2360/43
USPC ...................................................... 418/206.7
See application file for complete search history.

(56) References Cited

U.S. PATENT DOCUMENTS

| | | | | |
|---|---|---|---|---|
| 2,866,416 A | * | 12/1958 | Oliver | F04C 15/0026 418/132 |
| 3,528,756 A | * | 9/1970 | Keresman, Jr. | F04C 15/0088 418/73 |
| 4,395,207 A | * | 7/1983 | Manttari | F04C 2/086 418/102 |
| 4,682,938 A | | 7/1987 | Riordan | |
| 5,641,281 A | * | 6/1997 | Russell | F01C 21/02 418/102 |
| 6,716,010 B2 | * | 4/2004 | Eaton | F01C 21/02 418/132 |
| 8,308,366 B2 | | 11/2012 | Clements | |
| 8,944,793 B2 | | 2/2015 | Ni | |
| 9,303,529 B2 | | 4/2016 | Schelonka | |
| 9,611,847 B2 | | 4/2017 | Martin-Dye | |
| 2008/0240968 A1 | * | 10/2008 | Chiu | F04C 2/086 418/206.7 |
| 2012/0114514 A1 | * | 5/2012 | Laetzel | F04C 2/18 418/201.1 |

* cited by examiner

*Primary Examiner* — Phillip A Johnson
(74) *Attorney, Agent, or Firm* — Locke Lord LLP; Scott D. Wofsy; Joshua L. Jones

(57) ABSTRACT

A bearing for a gear pump includes a bearing body defining a bearing bore defined therethrough along an axis for receiving a gear shaft. The bearing bore defines a cylindrical bearing inner diameter surface. The bearing body defines an outer mating surface configured for mounting to another bearing body. A groove is defined in the inner diameter surface along an axial direction relative to the axis to provide clearance for gear journal motion between the inner diameter surface and the gear shaft. The groove is defined in a portion of the inner diameter surface opposite the mating surface.

16 Claims, 2 Drawing Sheets

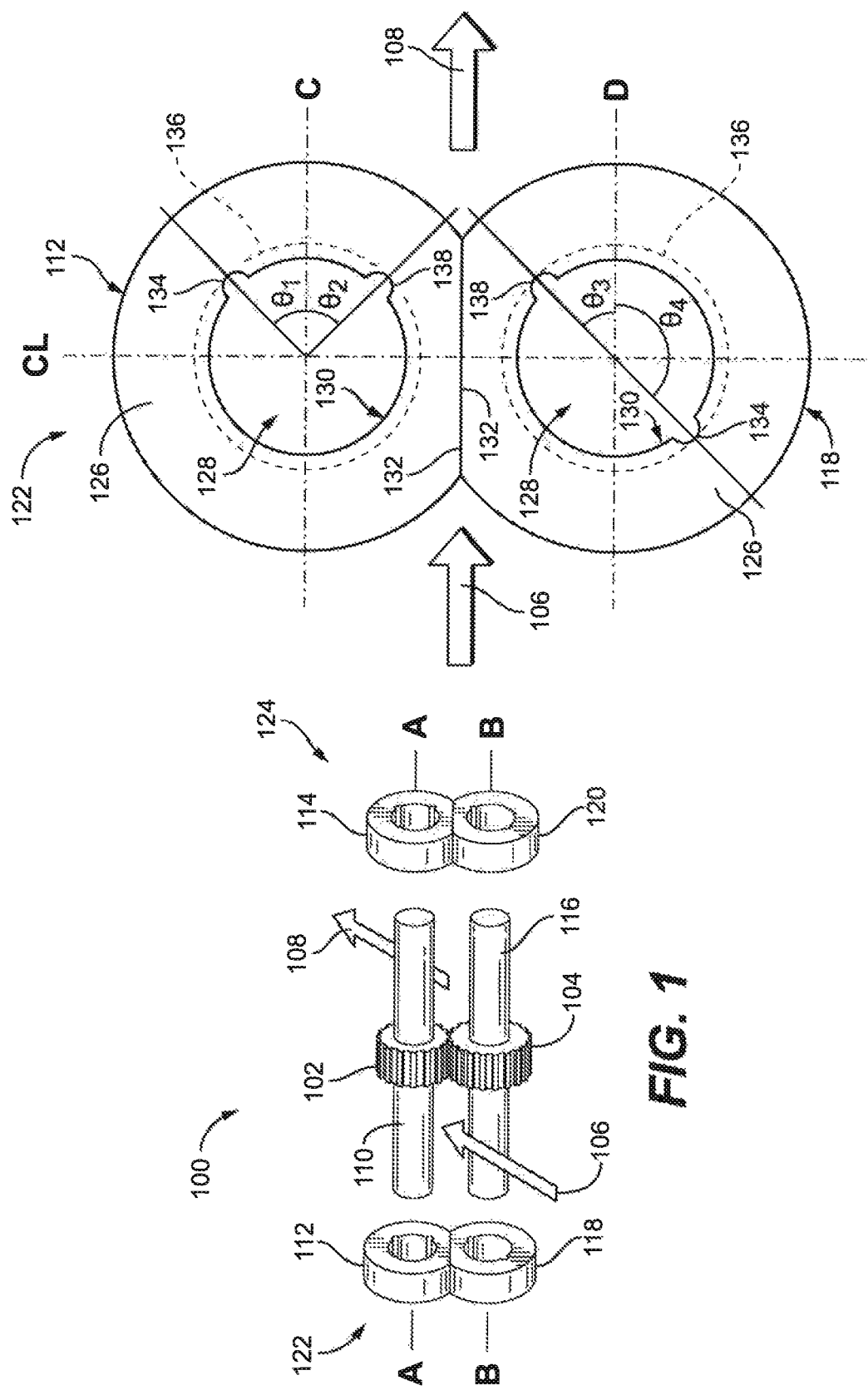

US 10,584,747 B1

FUEL PUMP BEARING WITH NON-CONCENTRIC INNER DIAMETERS

BACKGROUND OF THE INVENTION

1. Field of the Invention

The present disclosure relates to gear pumps, and more particularly to bearing arrangements for gear pumps such as used in an aircraft Fuel Metering Unit (FMU).

2. Description of Related Art

Gear pumps often include two gears, usually of a similar configuration, that mesh with each other inside of a housing. A first or drive gear is an extension of a drive shaft; as it rotates, it drives a second gear, commonly referred to as the driven gear. As the gears rotate within the housing, fluid is transferred from an inlet to an outlet of the pump. Either spur gears or helical gears may be used, however, spur gears are most common.

Traditional gear pumps have a clearing between the gear outer diameter and the housing bore inner diameter which can allow the gears to move within the housing at different operating conditions. Some gear journal bearings and gears require bearing inner diameter clearance (gear journal outer diameter clearance) that is less than the distance that the gears can travel within their bore. This can allow the gears to contact the bearings in some conditions.

The conventional techniques have been considered satisfactory for their intended purpose. However, there is an ever present need for improved pump bearings. This disclosure provides a solution for this need.

SUMMARY OF THE INVENTION

A bearing for a gear pump includes a bearing body defining a bearing bore defined therethrough along an axis for receiving a gear shaft. The bearing bore defines a cylindrical bearing inner diameter surface. The bearing body defines an outer mating surface configured for mounting to another bearing body. A groove is defined in the inner diameter surface along an axial direction relative to the axis to provide clearance for gear journal motion between the inner diameter surface and the gear shaft. The groove is defined in a portion of the inner diameter surface opposite the mating surface.

The groove can be defined in a half of the inner diameter surface that is farthest from the mating surface. The groove can be a clearance groove and a lubrication groove can be defined in the inner diameter surface along the axial direction relative to the axis to provide clearance for lubrication to enter the bearing. The lubrication groove can be defined in a portion of the inner diameter surface proximate the mating surface. The lubrication groove can be defined in a half of the inner diameter surface that is closest to the mating surface. The clearance groove and the lubrication groove can both be defined in an inlet half or in an outlet half of the inner diameter surface. The groove can have a lunate cross-sectional shape in axial cross section.

A bearing assembly for a gear pump includes a first bearing as described above and a second bearing as described above, wherein the mating surface of the first bearing is mounted to the mating surface of the second bearing. In the first bearing, the clearance groove and the lubrication groove can both be defined in an outlet half of the inner diameter surface, and in the second bearing, the clearance groove can be defined in an inlet half of the inner diameter surface and the lubrication groove can be defined in an outlet half of the inner diameter surface.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic exploded perspective view of an exemplary embodiment of a gear pump constructed in accordance with the present disclosure, showing the bearings;

FIG. 2 is a schematic axial end elevation view of two of the bearings of FIG. 1, showing two bearings assembled together.

DETAILED DESCRIPTION OF THE PREFERRED EMBODIMENTS

Figure 3:
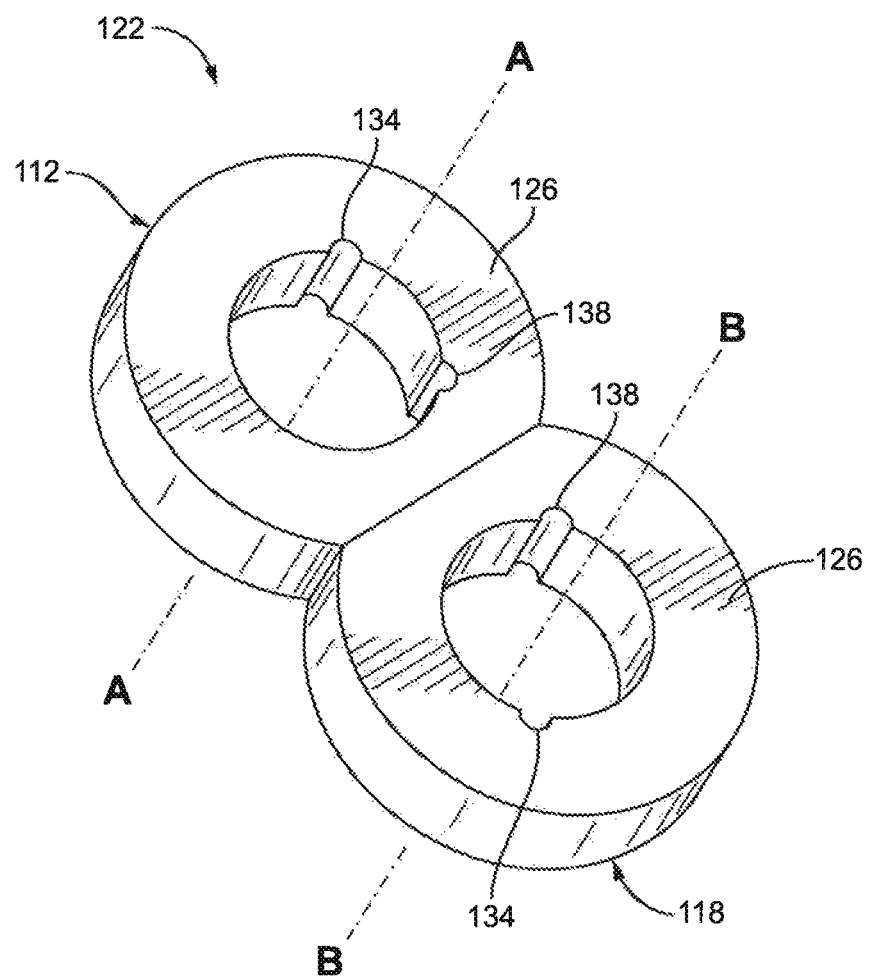
FIG. 3 is a schematic perspective view of the two bearings of FIG. 2.

Reference will now be made to the drawings wherein like reference numerals identify similar structural features or aspects of the subject disclosure. For purposes of explanation and illustration, and not limitation, a partial view of an exemplary embodiment of a gear pump in accordance with the disclosure is shown in FIG. 1 and is designated generally by reference character 100. Other embodiments of gear pumps in accordance with the disclosure, or aspects thereof, are provided in FIGS. 2-3, as will be described. The systems and methods described herein can be used to improve gear pump performance.

The gear pump 100 includes a drive gear 102 that meshes with a driven gear 104. Fluid introduced to a pump inlet, schematically indicated by the arrow 106 in FIG. 1, is captured between the teeth of the drive gear 102 and the driven gear 104 and is conveyed to the pump outlet, schematically indicated by the arrow 108 in FIG. 1. The drive gear 102 is mounted to a drive gear shaft 110, which is supported for rotation by a first journal bearing 112 on one side, and a second journal bearing 114 on the opposite side. The driven gear 104 is mounted to a driven gear shaft 116, which is supported for rotation by a third journal bearing 118 on one side, and a fourth journal bearing 120 on the opposite side. Journal bearings 112 and 118 are joined together in a first bearing assembly 122, and journal bearings 114 and 120 are joined together in a second bearing assembly 124 substantially similar to the first bearing assembly 124.

With reference now to FIG. 2, one of the bearing assemblies 122 is shown. Each bearing 112 and 118 includes a bearing body 126 defining a bearing bore 128 defined therethrough along an axis A or B, respectively for receiving the respective gear shaft 110, 116 of FIG. 1. Each bearing bore 128 defines a cylindrical bearing inner diameter surface 130. Each bearing body 126 defines a respective outer mating surface 132. The mating surface 132 of the first bearing 112 is mounted to the mating surface 132 of the second bearing 118. Note that these are not necessarily physically attached to one another, but can be installed adjacent to one another.

With reference to FIG. 3, a respective groove 134 is defined in the inner diameter surface 130 of each bearing 112 and 118 along an axial direction relative to respective the axis A, B to provide clearance for gear journal motion between the inner diameter surface 130 and the respective gear shaft 110, 116 of FIG. 1. The groove 134 is defined in a portion 136 indicated with dashed lines in FIG. 2 of the inner diameter surface 130 opposite the respective mating surface 132.

With reference again to FIG. 2, the groove 134 is defined in a portion 136 that spans a half of the inner diameter surface 130 that is farthest from the respective mating surface 132. The groove 134 is a clearance groove. In addition to the clearance groove 134, each bearing 112 and 118 includes a lubrication groove 138 that is defined in the inner diameter surface 130 along the axial direction relative to the respective axis A, B (shown in FIG. 3) to provide clearance for lubrication to enter the bearing 112, 118.

For each bearing 112, 118, the lubrication groove 138 is defined in a portion of the inner diameter surface 130 proximate the mating surface 132, i.e., in the opposite half of the bearing surface from the portion 136. For the drive bearing 112, the clearance groove 134 and the lubrication groove 138 are both defined in an inlet half of the inner diameter surface 130, i.e., to the right of the centerline CL in FIG. 2. For the driven bearing 118, the clearance groove 138 is in the inlet half, e.g., to the left of the centerline CL in FIG. 2 and the lubrication groove 134 is in the outlet half. Each groove 134, 138 has a lunate cross-sectional shape in axial cross section as viewed in FIG. 2. The clearance grooves 134 are centered on an angular axis separated by angle θ1, e.g. about −45 degrees, and θ4, e.g., 135 degrees, from their respective lateral axis C, D. The lubrication grooves 138 are centered on an angular axis separated by angle θ2, e.g., 60 degrees, and angle θ3, e.g. about −60 degrees, from their respective lateral axis C, D. Angles θ1 and θ4 are about 180 degrees apart.

Of the four gear bearings 112, 114, 118, 120 (all shown in FIG. 1), two are pressure loaded against the gears 102, 102 and move radially relative to the respective axes A, B, under pressure before equilibrium is reached where everything is sealed, e.g., during start up. Without the clearance grooves 134, the shafts 110, 116 contact bearing surfaces 130 (shown in FIG. 2), causing leakage. Grooves 134 alleviate this leakage. Grooves 134 are in a normally inactive region of the bearing surfaces 130 and so allow the shafts 110, 116 of gears 102, 104 to move fully within the bore 128 without making contact with the bearing surfaces 130. This can improve the volumetric efficiency of the pump 100 and prevent damage to the bearings 112, 114, 118, 120.

The non-concentric grooves 134 in the bearing ID surfaces 130 allow for larger gear motion before the gears 102, 104 contact the bearings 112, 118. Gear contact with bearings 112, 118 can cause damage or move the bearings 112, 118 to open internal leakage paths. This design can accommodate the large gear motion distance without any detriments.

The methods and systems of the present disclosure, as described above and shown in the drawings, provide for gear pumps with superior properties including improved pump performance. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bearing for a gear pump comprising:
   a bearing body defining a bearing bore defined therethrough along an axis for receiving a gear shaft, wherein the bearing bore defines a cylindrical bearing inner diameter surface, the bearing body defining an outer mating surface configured for mounting to another bearing body, wherein a groove is defined in the inner diameter surface along an axial direction relative to the axis to provide clearance for gear journal motion between the inner diameter surface and the gear shaft, wherein the groove is defined in a portion of the inner diameter surface opposite the mating surface.

2. The bearing as recited in claim 1, wherein the groove is defined in a half of the inner diameter surface that is farthest from the mating surface.

3. The bearing as recited in claim 1, wherein the groove is a clearance groove and further comprising a lubrication groove defined in the inner diameter surface along the axial direction relative to the axis to provide clearance for lubrication to enter the bearing.

4. The bearing as recited in claim 3, wherein the lubrication groove is defined in a portion of the inner diameter surface proximate the mating surface.

5. The bearing as recited in claim 4, wherein the lubrication groove is defined in a half of the inner diameter surface that is closest to the mating surface.

6. The bearing as recited in claim 1, wherein the groove is a clearance groove and further comprising a lubrication groove defined in the inner diameter surface along the axial direction relative to the axis to provide clearance for lubrication to enter the bearing, wherein the groove is defined in a half of the inner diameter surface that is farthest from the mating surface, wherein the lubrication groove is defined in a half of the inner diameter surface that is closest to the mating surface.

7. The bearing as recited in claim 6, wherein the clearance groove and the lubrication groove are both defined in an inlet half or an outlet half of the inner diameter surface.

8. The bearing as recited in claim 1, wherein the groove has a lunate cross-sectional shape in axial cross section.

9. A bearing assembly for a gear pump comprising:
   a first bearing including:
      a first bearing body defining a first bearing bore defined therethrough along a first axis for receiving a first gear shaft, wherein the first bearing bore defines a first cylindrical bearing inner diameter surface, the first bearing body defining a first outer mating surface, wherein a first groove is defined in the first inner diameter surface along an axial direction relative to the first axis to provide clearance for gear journal motion between the first inner diameter surface and the first gear shaft, wherein the first groove is defined in a portion of the first inner diameter surface opposite the first mating surface; and
   a second bearing including:
      a second bearing body defining a second bearing bore defined therethrough along a second axis for receiving a second gear shaft, wherein the second bearing bore defines a second cylindrical bearing inner diameter surface, the first bearing body defining a second outer mating surface that is mounted to the first mating surface, wherein a second groove is defined in the second inner diameter surface along an axial direction relative to the second axis to provide clearance for gear journal motion between the second inner diameter surface and the second gear shaft, wherein the second groove is defined in a portion of the second inner diameter surface opposite the second mating surface.

10. The bearing assembly as recited in claim 9, wherein the first groove is defined in a half of the first inner diameter surface that is farthest from the first mating surface, and wherein the second groove is defined in a half of the second inner diameter surface that is farthest from the second mating surface.

11. The bearing assembly as recited in claim 9, wherein the first groove is a first clearance groove and further comprising a first lubrication groove defined in the first inner diameter surface along the axial direction relative to the first axis to provide clearance for lubrication to enter the first bearing, and wherein the second groove is a second clearance groove and further comprising a second lubrication groove defined in the second inner diameter surface along the axial direction relative to the second axis to provide clearance for lubrication to enter the second bearing.

12. The bearing assembly as recited in claim 11, wherein the first lubrication groove is defined in a portion of the first inner diameter surface proximate the first mating surface, and wherein the second lubrication groove is defined in a portion of the second inner diameter surface proximate the second mating surface.

13. The bearing assembly as recited in claim 12, wherein the first lubrication groove is defined in a half of the first inner diameter surface that is closest to the first mating surface, and wherein the second lubrication groove is defined in a half of the second inner diameter surface that is closest to the second mating surface.

14. The bearing assembly as recited in claim 9, wherein the first groove is a first clearance groove and further comprising a first lubrication groove defined in the first inner diameter surface along the first axial direction relative to the first axis to provide clearance for lubrication to enter the first bearing, wherein the first groove is defined in a half of the first inner diameter surface that is farthest from the first mating surface, wherein the first lubrication groove is defined in a half of the first inner diameter surface that is closest to the first mating surface.

15. The bearing assembly as recited in claim 14, wherein in the first bearing, the first clearance groove and the first lubrication groove are both defined in an outlet half of the first inner diameter surface, and in the second bearing, the second clearance groove is defined in an inlet half of the second inner diameter surface and the second lubrication groove is defined in an outlet half of the second inner diameter surface.

16. The bearing assembly as recited in claim 9, wherein the first groove and the second groove each have a lunate cross-sectional shape in axial cross section.

* * * * *